(12) United States Patent
Danelski et al.

(10) Patent No.: US 11,987,451 B2
(45) Date of Patent: May 21, 2024

(54) NETWORKED MOTORIZED DRIVE ROLLER CONVEYOR

(71) Applicant: MATTHEWS INTERNATIONAL CORPORATION, Pittsburgh, PA (US)

(72) Inventors: Darin L. Danelski, Ocononmowoc, WI (US); Melvin W. Henry, Wales, WI (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 17/942,351

(22) Filed: Sep. 12, 2022

(65) Prior Publication Data

US 2023/0249918 A1    Aug. 10, 2023

Related U.S. Application Data

(63) Continuation of application No. 16/735,900, filed on Jan. 7, 2020, now Pat. No. 11,440,743, which is a continuation of application No. 16/230,304, filed on Dec. 21, 2018, now Pat. No. 10,549,920, which is a continuation of application No. 15/799,817, filed on Oct. 31, 2017, now Pat. No. 10,160,607, which is a continuation of application No. 14/920,284, filed on Oct. 22, 2015, now abandoned, which is a continuation of application No. 14/468,245, filed on Aug. 25, 2014, now abandoned, which is a
(Continued)

(51) Int. Cl.
*B65G 43/08* (2006.01)
*B65G 13/02* (2006.01)
*B65G 43/10* (2006.01)
*B65G 47/26* (2006.01)

(52) U.S. Cl.
CPC ............. *B65G 43/08* (2013.01); *B65G 13/02* (2013.01); *B65G 43/10* (2013.01); *B65G 47/261* (2013.01); *B65G 2811/0673* (2013.01)

(58) Field of Classification Search
None
See application file for complete search history.

(56) References Cited

U.S. PATENT DOCUMENTS 4,331,328 A * 5/1982 Fasig ................... B65H 5/34
271/259
6,023,034 A * 2/2000 Nakajima .............. B65H 39/10
198/460.3
(Continued)

*Primary Examiner* — Kavel Singh
(74) *Attorney, Agent, or Firm* — DLA Piper LLP

(57) ABSTRACT

A motorized drive roller conveyor includes an upstream zone and a downstream zone, with each zone having a drive roller, an idler roller that is driven by the drive roller, and a sensor. The upstream zone and the downstream zone are controlled by a card, which measures a gap between a first item on the conveyor and a second item on the conveyor by beginning a counter when a trailing edge of the first item passes the sensor of the upstream zone and stopping the counter when a leading edge of the second item passes the sensor of the upstream zone to generate a counter value. If the first item is stopped in the downstream zone, the card of the upstream zone causes the drive roller of the upstream zone to advance the second item into the downstream zone for a distance derived from the counter value before stopping the transportation of the second item.

15 Claims, 8 Drawing Sheets

Related U.S. Application Data continuation of application No. 13/192,679, filed on Jul. 28, 2011, now abandoned.

(60) Provisional application No. 61/368,902, filed on Jul. 29, 2010.

(56) References Cited

U.S. PATENT DOCUMENTS

| | | | | |
|---|---|---|---|---|
| 6,820,736 B2* | 11/2004 | Itoh | ............... | B65G 47/31 |
| | | | | 198/781.01 |
| 7,542,823 B2* | 6/2009 | Nagai | ............... | B65G 47/261 |
| | | | | 198/781.05 |
| 7,591,366 B2* | 9/2009 | Taylor | ............... | B65G 47/261 |
| | | | | 198/349.9 |
| 8,746,437 B2* | 6/2014 | Schiesser | ............... | B65G 47/31 |
| | | | | 198/460.1 |

* cited by examiner

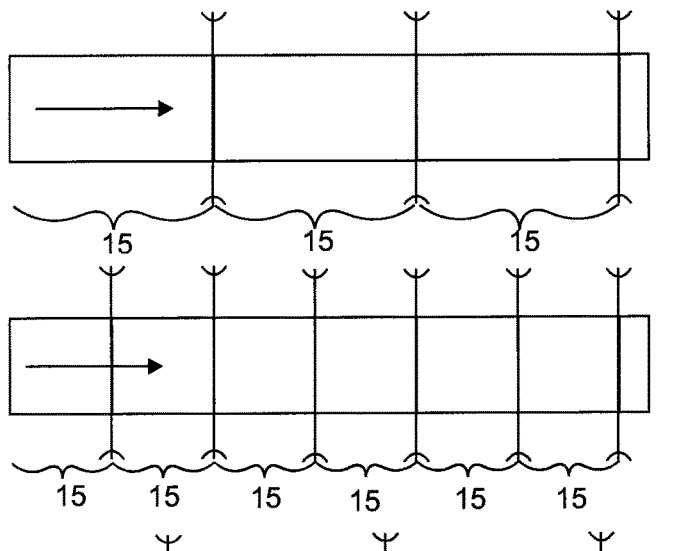
FIG. 11A
STD Zone Accum.
FIG. 11B
Back to Back Accum
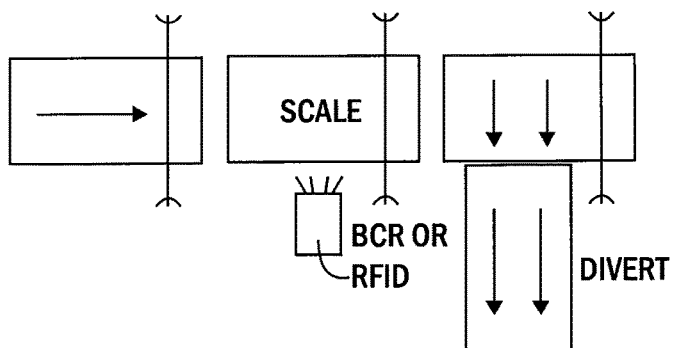
FIG. 11C
Weigh Scale
(Divert Option)
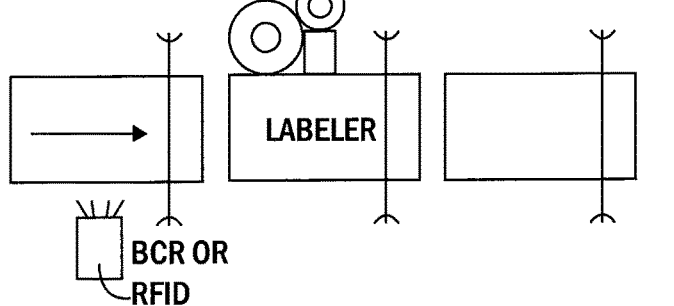
FIG. 11D
P+A Labeler
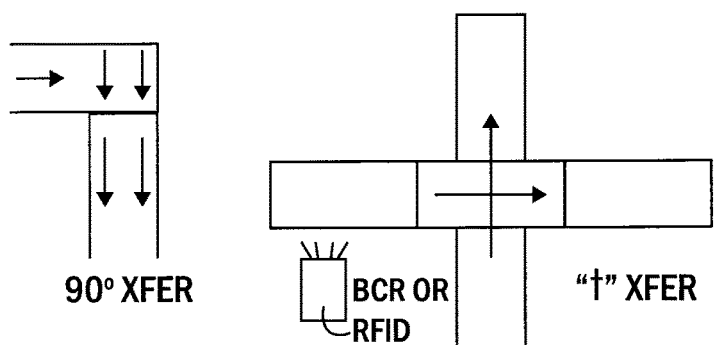
90° XFER
FIG. 11E
"†" XFER
FIG. 11F
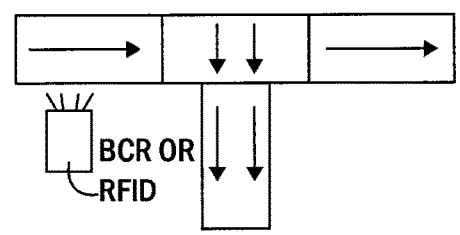
"T" XFER
FIG. 11G

NETWORKED MOTORIZED DRIVE ROLLER CONVEYOR

The present application is a continuation application of U.S. patent application Ser. No. 16/735,900, filed on Jan. 7, 2020, entitled "Networked Motorized Drive Roller Conveyor," which is a continuation application of U.S. patent application Ser. No. 16/230,304, filed on Dec. 21, 2018, entitled "Networked Motorized Drive Roller Conveyor," which is a continuation application of U.S. patent application Ser. No. 15/799,817, filed on Oct. 31, 2017, now U.S. Pat. No. 10,160,607 issued on Dec. 25, 2018, which is a continuation application of U.S. patent application Ser. No. 14/920,284, filed on Oct. 22, 2015, which is now abandoned, which is a continuation application of U.S. patent application Ser. No. 14/468,245, filed on Aug. 25, 2014, which is now abandoned, which is a continuation application of U.S. patent application Ser. No. 13/192,679, filed Jul. 28, 2011, which is now abandoned, which claims the benefit of and priority to U.S. Provisional Application No. 61/368,902, filed on Jul. 29, 2010. The contents of each of these applications are hereby incorporated by reference herein in their entireties.

BACKGROUND AND SUMMARY OF THE INVENTION

The present invention relates generally to a networked motorized drive roller conveyor.

Conventional conveyor control systems utilize a central Programmable Logic Controller ("PLC") mounted in a central control panel. This type of system requires control devices, e.g., photo-eyes, solenoid valves, and motor starters, to be terminated at the main control panel. A typical control system utilizing a PLC requires several hundred to several thousand feet of control wiring, which requires significant time, labor and money to route and terminate the wiring. In addition, the PLC requires specialized knowledge, e.g., knowledge of ladder logic, and familiarity with the many different interface requirements unique to each manufacturer's product. Moreover, since there is a central controller, response time with respect to the control devices may be increased because the single processor must account for all operations occurring within the system.

A Motorized Drive Roller ("MDR") is a conveyor roller with an integrated motor. An MDR is typically configured to drive a plurality of idler rollers, usually by way of urethane belts or chains. The MDR and idler rollers thus define a zone. There is typically one MDR per zone.

For conveyor systems that utilize MDR technology, networked motor controllers are frequently used to handle basic transport, diversion, and accumulation tasks to move items through a conveyor system. These motor controllers are mounted in close proximity to the MDR rollers and directly interface with the product sensors associated with each MDR. An MDR conveyor system has many advantages over other conveyor technologies, such as lower power consumption, noise reduction, and a decreased need for maintenance.

Unlike conventional control systems, modular distributed controls don't require hundreds to thousands of feet of wiring from a centralized PLC to each device in the system. With controls located near the control devices, wiring and wiring labor may be reduced. This shortens the time to complete implementation and provides a parallel control capability that minimizes response time issues common to conventional PLC based systems. Because the system is not limited by the speed of a central processor in a PLC, the system can grow without worry of overtaxing a centralized controller. Testing and start-up time is also reduced, as various segments of the system can be installed and tested independent of other segments.

It is common practice in existing conveyor systems that use MDR roller conveyor along with associated motor controllers to utilize smaller, localized PLC's distributed throughout the system to handle conveyor operations such as diverting, bar code scanning, RFID communication, label applications, etc. These peripherals typically communicate serially (RS232 or RS485) or via a network protocol such as Ethernet. Having multiple PLCs in this environment creates other undesirable issues as single point diagnostics are difficult to implement.

The networked, distributed control system of the present invention provides localized controls for various operations, e.g., diverting, bar code scanning, RFID transactions, labeling, etc. The inventive control system can also handle the basic MDR conveyor drive and accumulation responsibilities, which greatly reduces the wiring needed for the system, implementation time, and cost while maintaining a centralized diagnostic capability. Additional capability to allow localized programming as well as status and diagnostics capability are additional benefits of the inventive control system. Eliminating the need for PLCs and associated ladder logic is a further benefit of the inventive design because it reduces the complexity of installation, operation and modification of the control system and corresponding conveyor system.

As noted above, MDR conveyor systems have many advantages over other conveyor technologies, such as lower power consumption, noise reduction, and less maintenance. However, prior to the present invention, MDR systems lacked the ability to control the size of gaps between items on the conveyor system. Prior art systems are also limited to transporting "Items" that are shorter in length than a single "Zone".

Existing technology is typically marketed as "Zero pressure Accumulation" conveyor technology, as items on the conveyor are allowed to accumulate with one item per zone. As such, with control technology currently marketed, items accumulate with varying gaps between items, based on the length of the items.

In accordance with one aspect of the inventive conveyor control system, a gap control arrangement is used to control gaps between items on the conveyor system. The elimination of gaps between items on the conveyor system is desirable, in that gaps reduce the number of items that can be accumulated on the conveyor, providing lower accumulation efficiency. Thus, reducing or even eliminating gaps between items helps to maximize the accumulation efficiency of the conveyor system. The gap control system incorporates the use of MDR technology and its desirable attributes while at the same time providing the operator with the ability to control the size of the gaps between items on the conveyor system.

In one embodiment of the invention, a networked motorized drive roller conveyor includes a plurality of motorized drive roller assemblies, where each assembly comprises a zone. The conveyor has a plurality of networked cards, with each card controlling a pair of adjacent zones. The conveyor further has a plurality of sensors for detecting items on the conveyor, with each sensor corresponding to a zone. For a pair of adjacent zones, the corresponding networked card measures a gap between consecutive items on the conveyor by beginning a counter when a trailing edge of a first item passes the sensor of an upstream zone within the pair of zones, and stopping the counter when a leading edge of the second item passes the sensor of the upstream zone within the pair of zones, to generate a counter value. If the first item is stopped in the downstream zone, the networked card causes the motorized drive roller assembly of the upstream zone to move the item into the downstream zone a distance derived from the counter value before stopping the movement of the second item.

In another embodiment of the invention, a motorized drive roller conveyor includes an upstream zone and a downstream zone. Each zone has a drive roller, an idler roller that is driven by the drive roller, and a sensor. A card controls the upstream zone and the downstream zone. The card measures a gap between a first item on the conveyor and a second item on the conveyor by beginning a counter when a trailing edge of the first item passes the sensor of the upstream zone and stopping the counter when a leading edge of the second item passes the sensor of the upstream zone to generate a counter value. If the first item is stopped in the downstream zone, the card of the upstream zone causes the drive roller of the upstream zone to advance the second item into the downstream zone for a distance derived from the counter value before stopping the movement of the second item.

In yet another embodiment of the invention, a method for controlling a gap between items on a motorized drive roller conveyor includes the steps of: (a) detecting a trailing edge of a first item at a predetermined location in a first zone on a conveyor system; (b) beginning a counter once the trailing edge of the first item passes the predetermined location; (c) stopping the counter upon the first occurrence of the following:(i) a leading edge of a second item is detected at the predetermined location, or (ii) the first item is stopped in a downstream zone adjacent the first zone; and (d) generating a counter value.

These and other aspects and advantages of the present invention will be made apparent from the following description taken together with the drawings.

BRIEF DESCRIPTION OF THE DRAWINGS

An exemplary embodiment of the invention is illustrated in the accompanying drawings in which like reference numerals represent like parts throughout.

In the drawings:

FIGS. 11A-11G are schematic views of various conveyor configurations that may be integrated into a networked MDR conveyor in accordance with the present invention.

DETAILED DESCRIPTION

Figure 1:
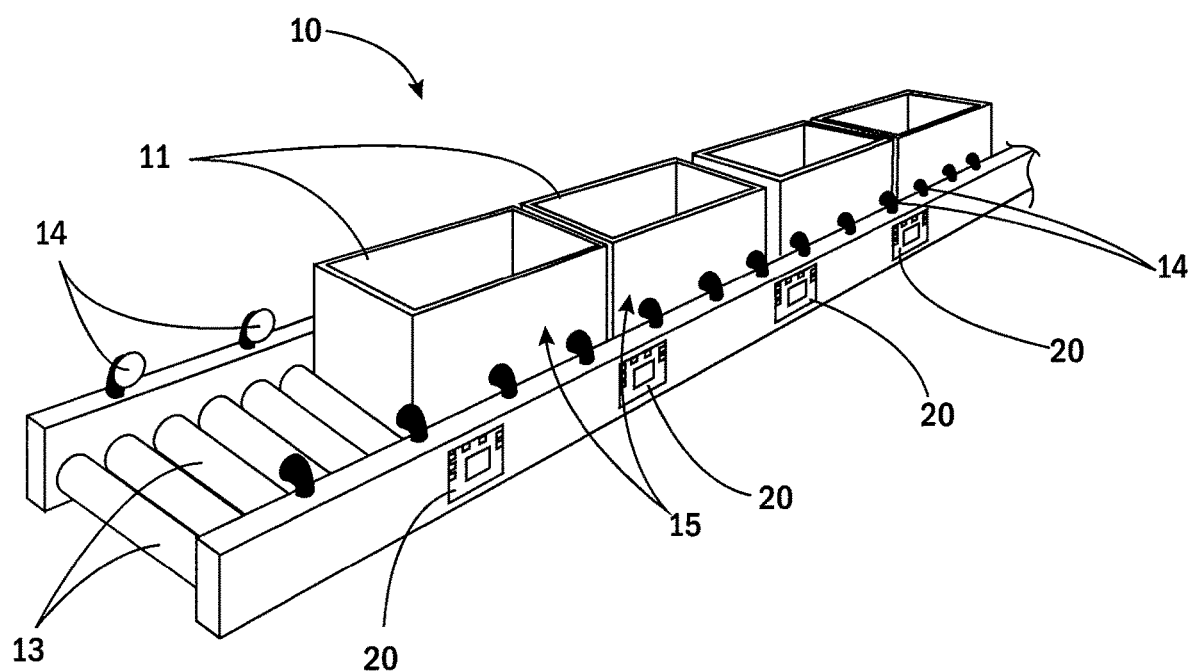
FIG. 1 is an isometric view of a networked MDR conveyor in accordance with the present invention.

FIG. 1 shows a portion of the conveyor system 10 of the present invention that incorporates control cards 20 in accordance with the present invention. Generally speaking, a number of items 11 are supported on the conveyor 10, which includes a plurality of rollers 13, including MDRs and corresponding idler rollers. The conveyor system 10 further includes a plurality of sensors 14 that detect items 11 as the items 11 move along the conveyor system 10. The conveyor system 10 is divided into zones 15. Each zone 15 is defined between adjacent sensors 14. Additionally, each zone 15 corresponds with an MDR/idler roller assembly. In the inventive system, each zone 15 is shorter than the length of the respective items 11 being conveyed by the conveyor system 10.

Figure 2:
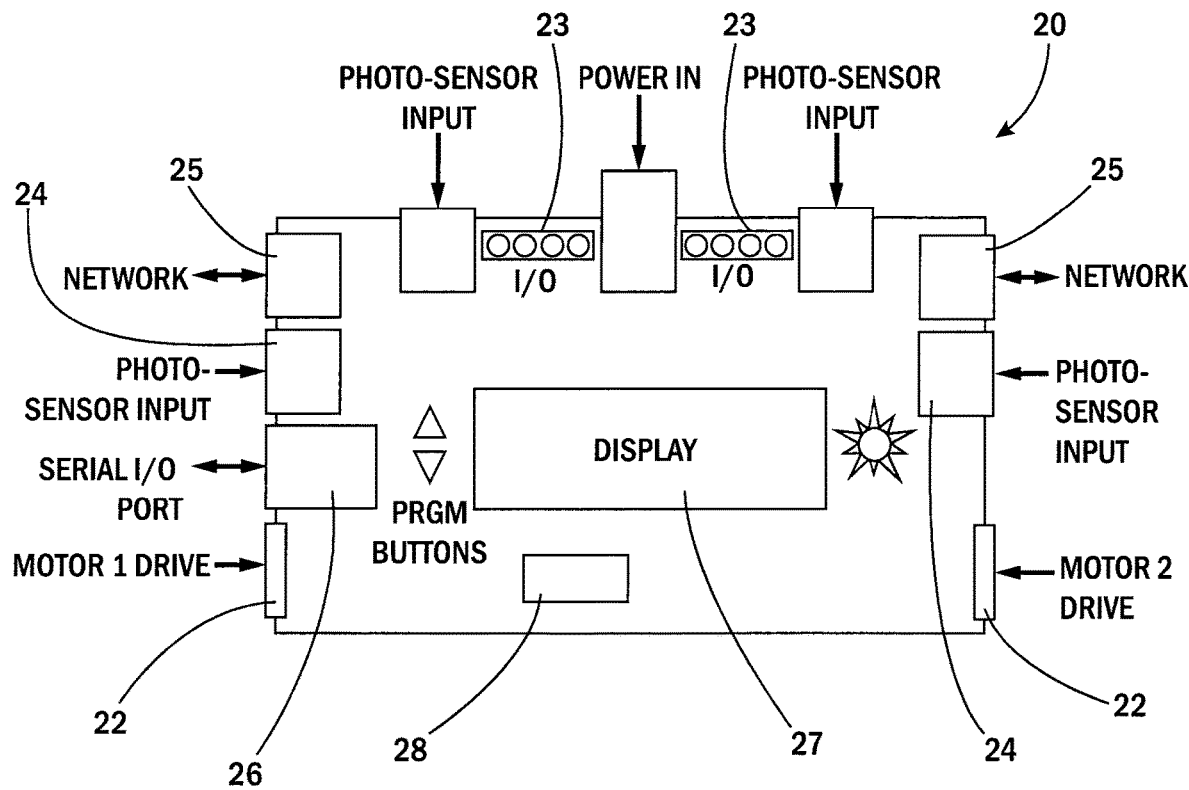
FIG. 2 is schematic of a card used in connection with the networked MDR conveyor of the present invention.
Figure 3:
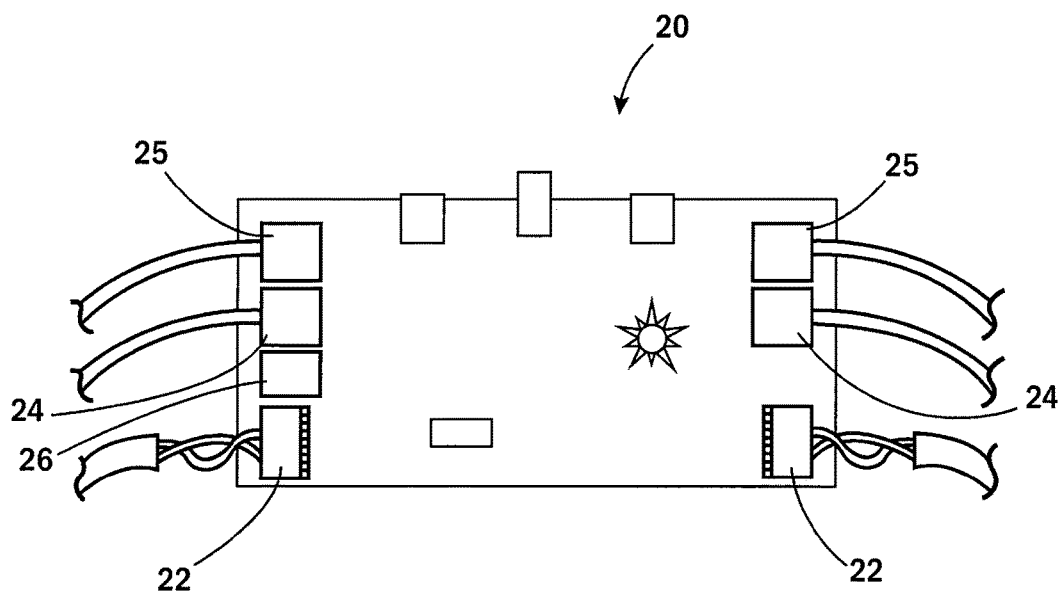
FIG. 3 is a representation of a physical embodiment of a card used in connection with the networked MDR conveyor of the present invention.
Figure 4:
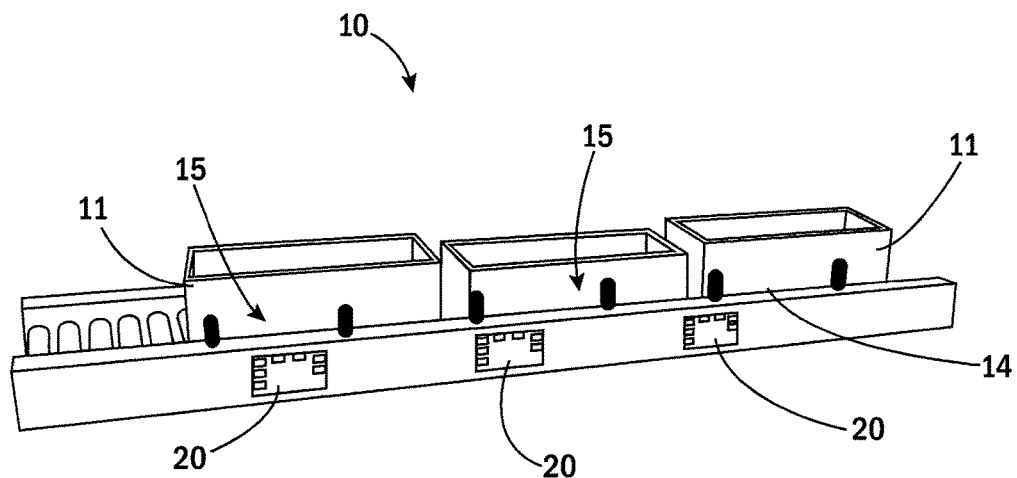
FIG. 4 is another isometric view of the networked MDR conveyor of FIG. 1.

FIGS. 2 and 3 illustrate a networked, distributed MDR control card 20 with local control capabilities. Accordingly, the inventive card 20 eliminates the need for a central PLC and reduces and/or eliminates the need for wiring associated with a system using a PLC. As a result, implementation and installation costs of a conveyor control system 10 incorporating the MDR control cards 20 of the present invention may also be reduced while, at the same time, providing a more efficient installation and implementation process. Still further, the card 20 of the present information is programmable, and therefore is able to be reprogrammed depending on its desired utilization.

In the illustrated embodiment, the card 20 contains drivers 22, e.g., on a microprocessor, for one or more MDR rollers, which preferably feature a dual brushless motor. More specifically, for zero-pressure accumulation mode of operation, e.g., one in which the items on the conveyor are not intended to contact one another, each card 20 will service two zones 15. In other words, the card 20 will contain drivers for respective MDR rollers in adjacent zones 15. The drivers are adapted to support any variation of MDR roller, e.g. commonly available MDR rollers, e.g., those ranging from 22 watts to 50 watts, may be used.

The card 20 of the present invention includes a plurality of Inputs and Outputs ("I/O") 23 for interfacing with various components that are typically utilized in conveyor assemblies, e.g., limit switches, solenoid valves, motor contactors, alarms/buzzers, and status beacons.

The card 20 further includes a plurality of photo sensor input jacks 24 that connect with sensors 14, which, as discussed above, detect items 11 that move along the conveyor system 10. For example, four such jacks 24 are shown on the block diagram in FIG. 2; see also, FIG. 3. The card 20 also includes one or more network jacks 25 to provide network communications capabilities for connection to a supervisory control computer (e.g., a personal computer or industrial computing device). The illustrated embodiment incorporates a CAN network using Can-Open or Device-Net protocols, although Ethernet or serial communications could also be utilized. In this arrangement, any card 20 in the conveyor system 10 can communicate over the network to any other card 20 attached to the network or to a supervisory control element, such as a PC or industrial controller.

Accordingly, system-wide changes, e.g., relating to product volume, conveyor speed, etc., can be implemented using any card 20 on the network.

The card 20 further includes a serial I/O port 26 to facilitate communications with external peripheral devices such as bar code scanners, RFID reader/writer devices, label applicators, in motion weigh scales, or other serial devices.

The card 20 may also feature an operator interface display 27. For example, the display may include button switches for interfacing with the module, a high intensity beacon for fault and error notification, and a display element that provides textual and/or graphical information to the operator. An operator interface display allows parameters such as roller speed, acceleration and deceleration rates, delays, etc. to be set locally from any card 20, rather than from a central point such as a PLC.

In this description, the term "card" is used to describe item 20, which controls operation of adjacent zones in conveyor system 10. It is understood that the term "card" is used for convenience, and that item 20 may be any satisfactory control device that includes the features and functionality to connect to the sensors and drive rollers of the adjacent zones of conveyor system 10 and to control their operation. The term "card" is not intended to denote any particular structural or physical characteristics of the control device.

The inventive conveyor system 10 improves upon existing designs by entirely eliminating the need for a PLC controller for normal conveyor operations. The conveyor system 10 allows additional functions to be implemented seamlessly without the need for PLCs or any knowledge of ladder logic on the part of the operator or system installer.

FIG. 11 shows typical configurations that are included in conveyor systems. While typically controlled by a PLC, in the inventive conveyor system 10 these operations are controlled locally by any one or group of cards 20 in the conveyor system 10. Such typical configurations include but are not limited to the following examples. For example, FIG. 11A shows a zone accumulator and FIG. 11B shows a back-to-back accumulator.

One configuration is an interface with an in-motion weigh scale as shown in FIG. 11C, which allows items 11 to be singulated and transported singly over an in-motion weigh scale. An identification device, such as a bar code scanner or RFID device, is connected directly to a card 20 and provides the method of identification of the item 11. The weight of the item 11 is compared locally, i.e., at a card 20, with an expected result and a decision is made locally, i.e., at a card 20, to allow the item 11 to continue along the conveyor system 10 or to be diverted off to a second conveyor in the event the weight of the item 11 is not within a defined tolerance. The I/O 23 on the card 20 will be utilized to communicate with the in-motion weigh scale.

Another type of configuration is an interface with a label applicator or "print and apply" label applicator as shown in FIG. 11D. This configuration allows items 11 to be singulated and transported singly past a labeler, such as an in-motion labeler, static label only, or "print and apply" labeler. An identification device, e.g., a bar code scanner or RFID device, is connected directly to the card 20 and provides the method of identification of the item 11. The information required on the label is determined locally on the card 20. The label is printed (if necessary) and applied and then the item 11 is passed on to the next conveyor zone 15. The I/O 23 on the card 20 will be utilized to communicate with the printer/applicator.

Another type of configuration is a 90 degree transfer as shown in FIG. 11E. This pre-programmed operation will facilitate an item 11 transfer from one conveyor zone 15 to another completing a 90 degree right angle transfer. A corresponding card 20 processes the timing required to ensure that the item 11 is completely transferred prior to initiating the next transfer of an item. The card 20 further processes any additional input/output required to signal the transfer device.

Yet another configuration is a "+" transfer as shown in FIG. 11F. This pre-programmed operation will facilitate an item transfer from one conveyor zone to one of three possible divert points. An identification device, e.g., a bar code scanner or RFID, is connected directly to a corresponding card 20 and provides the method of identification of the item 11. The desired divert location is determined locally on the card 20 and the item 11 is either allowed to continue on or is diverted to one of two other conveyors completing a 90 degree right angle transfer. The card 20 processes the timing required to ensure that the item 11 is completely transferred prior to initiating the next decision relating to a subsequent item transfer. The card 20 further processes any additional input/output required to signal the transfer device.

Another configuration is a "T" transfer as shown in FIG. 11G. This pre-programmed operation facilitates an item transfer from one conveyor zone to one of two possible divert points. An identification device, e.g., a bar code scanner or RFID, is connected directly to a corresponding card 20 and provides the method of identification of the item 11. The desired divert location is determined locally on the card 20 and the item 11 is either allowed to continue on or is diverted to another conveyor completing a 90 degree right angle transfer. The card 20 processes the timing required to ensure that the item 11 is completely transferred prior to initiating the next decision relating to a subsequent item transfer. The card 20 further processes any additional input/output required to signal the transfer device.

The illustrated embodiment includes either a display on the card 20 or a touch screen type interface on a personal computer or industrial computing device. The touch screen allows a setup operator to easily drag and drop the aforementioned pre-programmed operations to each card 20, with no knowledge of programming ladder logic or other programming required. The interface also allows parameters such as speed, timing, direction, etc. to be easily communicated to the individual cards 20 via the network.

The illustrated embodiment of the conveyor system 10 also has the ability to retain a backup of each card 20 in the system, should a replacement be required because of a card failure. The parameters and standard code blocks can simply be downloaded to the card 20, greatly minimizing downtime in the event of a card failure.

Figure 5:
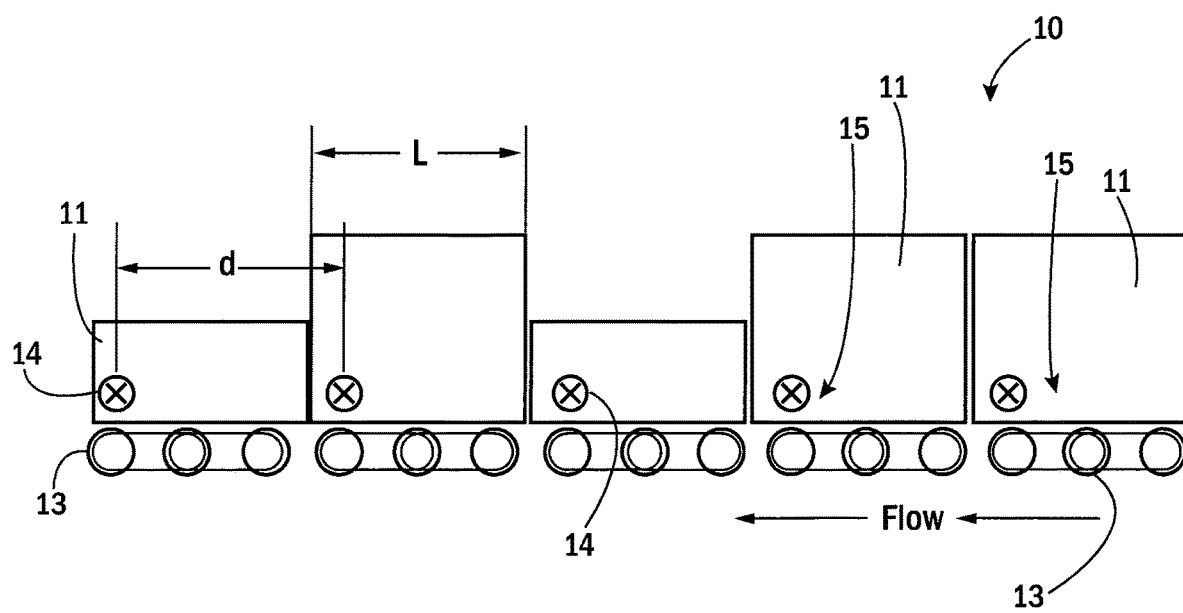
FIG. 5 is a schematic side elevation view of a networked MDR conveyor of the present invention.

As discussed above, it is not desirable to have gaps 30 between items 11 on a conveyor system 10. The gap control system of the present invention uses MDR rollers in conjunction with cards 20 and sensors 14 to control the gaps 30 between items 11. As shown in FIG. 5, for example, in the illustrated embodiment, any item 11 being conveyed is greater in length "L" (measured longitudinally along the direction of flow of the conveyor) than the distance "d" between the zone sensors 14. The sensors 14 are preferably photo-eye type sensors, but any type of sensor capable of determining the presence of an item 11 could be used, including, but not limited to, proximity sensors, limit switches, strain gauges, weight measurement devices, imagers, or ultrasonic sensors.

Figure 6:
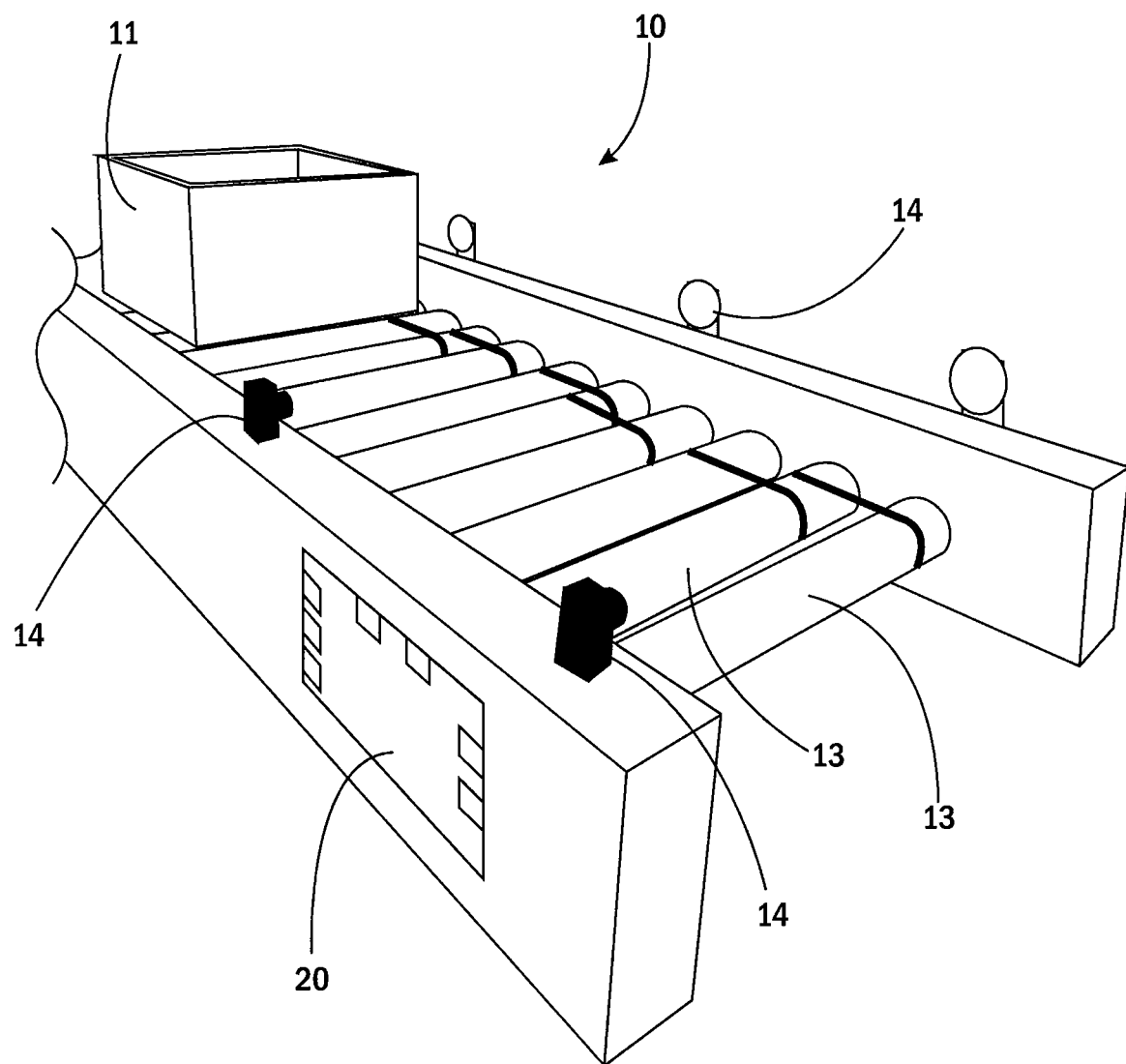
FIG. 6 is an enlarged partial isometric view of the networked MDR conveyor of FIG. 1.
Figure 7:
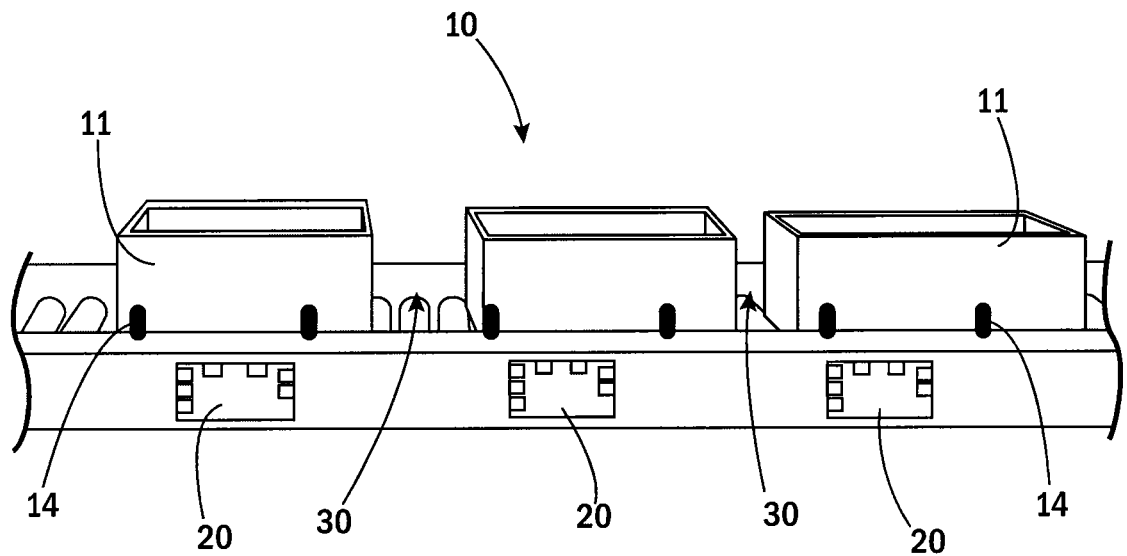
FIG. 7 is a side view of the networked MDR conveyor of FIG. 1 illustrating gaps between items on the conveyor.
Figure 8:
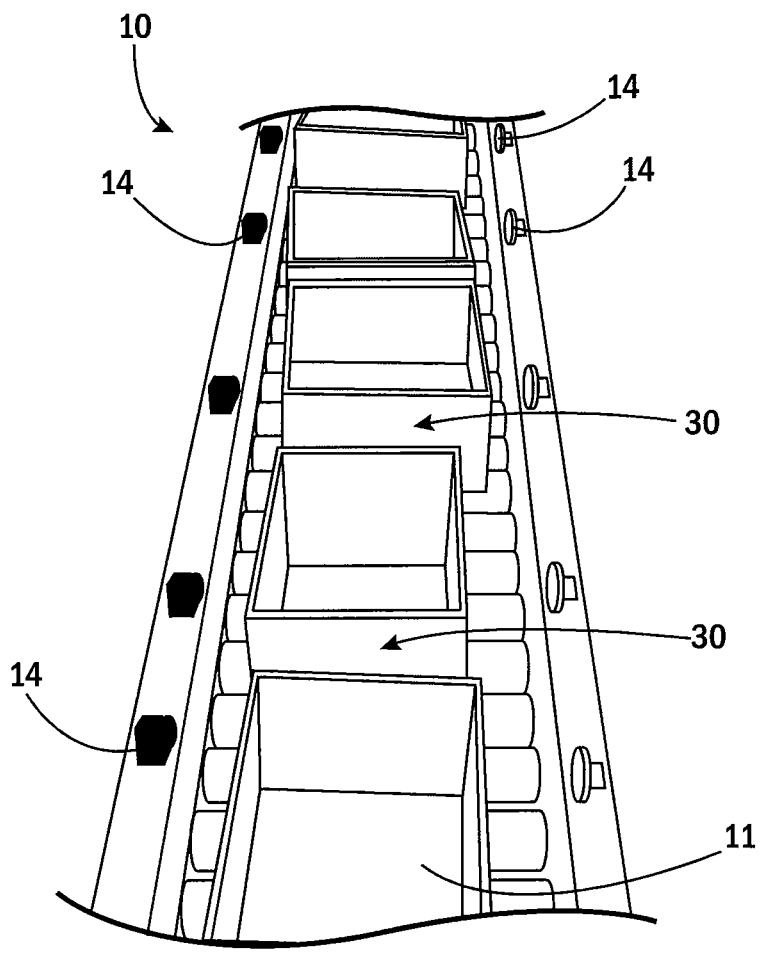
FIG. 8 is a top view of the networked MDR conveyor of FIG. 1.

Depending on the nature of the items 11 being conveyed, the size of the zones 15 may be smaller than the arrangement shown in FIG. 1. Accordingly, the spacing of sensors 14 may be varied to accommodate items 11 of various sizes. Referring to FIG. 6, items 11 of length "L" must be greater than distance "d," the distance between sensors (and also the length of the zone), in other words, the length of zone 15, in order to effectively eliminate gaps between items. Alternatively, where the item length "L" is less than distance "d," in some circumstances it may not be possible to effectively eliminate the gap between an upstream item and a stopped downstream item depending upon the location at which the downstream item is stopped within the downstream zone. The zone length can be varied as desired depending on the size of the items to be conveyed. Thus, the zone length may be greater than the item length or less than the item length as desired.

Figure 9:
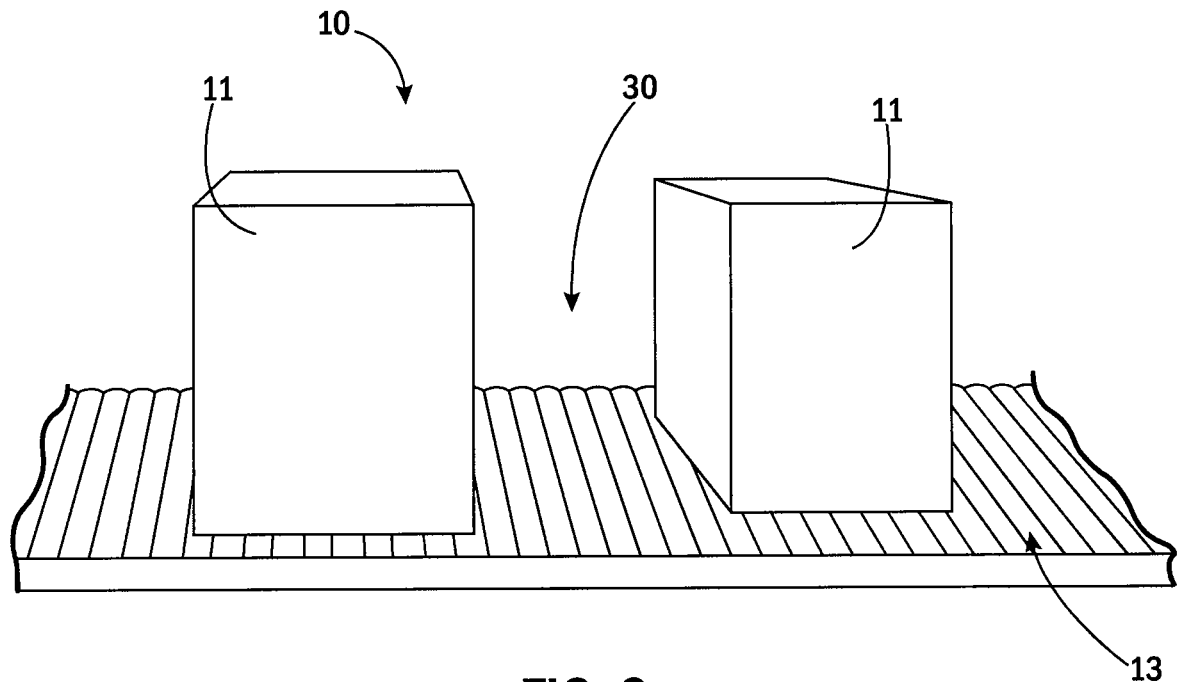
FIG. 9 is a side isometric view of a second embodiment of a networked MDR conveyor in accordance with the present invention.
Figure 10:
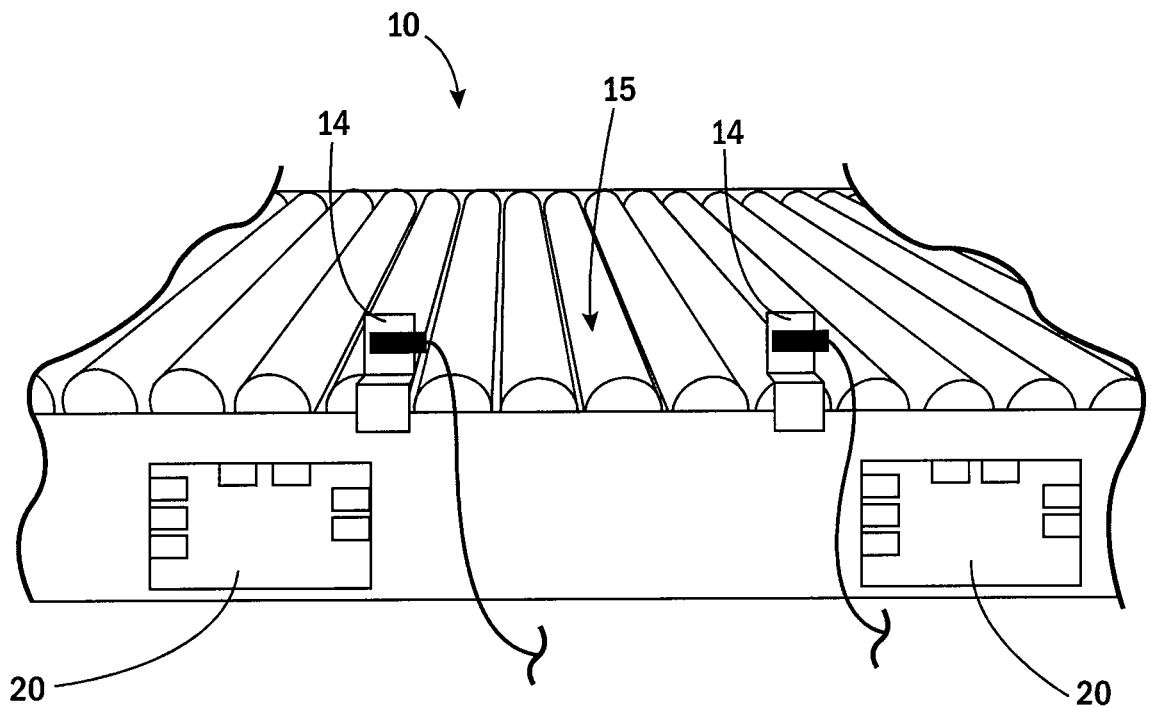
FIG. 10 is an enlarged partial side isometric view of the networked MDR conveyor of FIG. 9.

FIGS. 4-8 show one embodiment of the conveyor system 10 featuring the gap control system of the present invention. FIGS. 9-10 show a second embodiment of a conveyor system 10 featuring the inventive gap control system.

The illustrated embodiment uses brushless DC motors integrated within the MDRs. These motors provide feedback as to the position of the roller, e.g., via Hall effect sensors that are integral with the motor itself. The inventive gap control system utilizes the feedback from the Hall effect sensors to dynamically determine the length of the gap 30 between items 11 that are transported on the conveyor system 10.

More specifically, as an item 11 passes a sensor 14, the sensor 14 transitions from blocked (i.e., when the item 11 is triggering the sensor 14) to unblocked (i.e., when the item 11 is not triggering the sensor 14). Accordingly, as an item 11 passes a sensor 14, a counter is initiated within a microprocessor 28 on the card 20. The counter counts the number of pulses received by the Hall effect sensor within an MDR until a subsequent item 11 blocks the sensor 14. In other words, the counter records the number of pulses received from the MDR while no item 11 was being transported by the MDR, which is a measure of the gap 30 between consecutive items 11. A counter value is calculated and maintained for every sensor 14 in the conveyor system by corresponding cards 20. Thus, as a downstream item 11 approaches a blocked zone 15, the corresponding counter value is used to continue to transport an item 11 the requisite number of pulses, i.e., the number of pulses stored in the counter value, in order to close the gap 30. This effectively transports the item 11 right up to the stopped item 11, barely touching it, providing zero pressure accumulation as desired.

In addition to the scenario discussed above, i.e., wherein a sensor 14 detects a second item 11 after a first item 11 has passed the sensor 14, there is another scenario in which the counter may be stopped. Specifically, the second scenario occurs when an item 11 that has passed a particular sensor 14 is stopped on the conveyor system 10 before a second item 11 is detected by the particular sensor 14. In other words, the item 11 is stopped before the second item 11 reaches the particular sensor 14. Thus, when the item 11 has been stopped, the card 20 corresponding to the downstream zone 15 in which the item 11 is stopped communicates with the card 20 corresponding to the adjacent upstream zone 15, which then stops the counter. Accordingly, the counter value represents the distance between the end of the stopped, downstream item 11 and the sensor 14 in the adjacent, upstream zone 15. Thus, the cards 20 communicate with one another such that a subsequent item 11 is moved up to the stopped item 11, thus closing the gap 30 between the two items.

The illustrated embodiment also allows the counter value to be converted to a known distance, such that the counter value could be modified to allow the user to select a desired gap distance between items 11 so that items 11 do not touch, but have a minimal gap 30.

Figure 12:
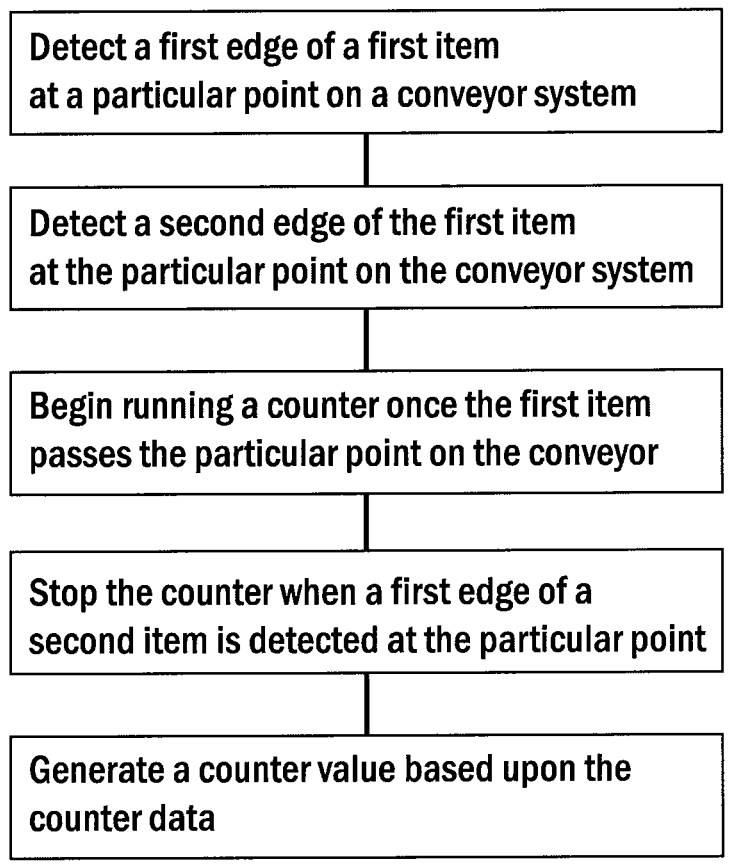
FIG. 12 is a flow chart illustrating a method of determining the size of a gap between items in the networked MDR conveyor in accordance with the present invention.

The present invention further includes a method for determining a gap 30 between items 11 on a conveyor system 10. Generally speaking, as shown in FIG. 12, the method includes the steps of (a) detecting a first edge of a first item at a predetermined location on a conveyor system; (b) detecting a second edge of the first item at the predetermined location on the conveyor system; (c) beginning a counter once the second edge of the first item passes the predetermined location on the conveyor system; (d) stopping the counter once a first edge of a second item is detected at the predetermined location; and (e) generating a counter value based upon the counter data. Accordingly, the counter value represents a gap 30 between adjacent items 11 on a conveyor system 10.

Additional steps of the method may include using the counter value to eliminate the gap 30 between the items 11. For example, the counter value may be used to rotate an MDR a corresponding number of rotations in order to close the gap 30 between the adjacent items 11 in the event that the downstream item 11 has been stopped on the conveyor system. Moreover, the counter value may be adjusted or converted to a predetermined value so that the size of the gap remains fixed if a gap (preferably minimal) between items 11 is desired.

The method may also include steps to stop the counter when an item has been stopped in a downstream zone. For example, the method may include the steps of (a) detecting a first edge of a first item at a predetermined location on a conveyor system; (b) detecting a second edge of the first item at the predetermined location on the conveyor system; (c) beginning a counter once the second edge of the first item passes the predetermined location on the conveyor system; (d) stopping the counter when the item has been stopped on the conveyor system; and (e) generating a counter value based upon the counter data. Further steps may include using the counter data to rotate an MDR a corresponding amount of rotations in order to close the gap 30 between the adjacent items 11.

Various alternatives and modifications are contemplated as being within the scope of the following claims particularly pointing out and distinctly claiming the subject matter regarded as the invention.

We claim:

1. A motorized drive roller conveyor comprising:
one or more networked cards, each card configured to control one or more adjacent zones, each zone comprising a motorized drive roller assembly and a sensor configured to detect items on the conveyor,
wherein the one or more networked cards are configured to:
measure a gap between a first item and a second item positioned consecutively on the conveyor by beginning a counter when a trailing edge of the first item passes the sensor and stopping the counter when a leading edge of the second item passes the sensor to generate a counter value indicating a length of the gap, and in response to the first item being stopped, advance the second item a distance derived from the counter value to adjust the length of the gap.

2. The motorized drive roller conveyor of claim 1, wherein the gap is measured by counting the rotations of a drive roller.

3. The motorized drive roller conveyor of claim 2, wherein the rotations of the drive roller are counted by counting the rotations of an integrated motor in the drive roller.

4. The motorized drive roller conveyor of claim 3, wherein the rotations of the integrated motor in the drive roller are counted using a Hall effect sensor.

5. The motorized drive roller conveyor of claim 1, wherein the distance is equal to the length of the gap in order to eliminate the gap.

6. The motorized drive roller conveyor of claim 1, wherein the distance is less than the length of the gap in order to adjust the length of the gap to a predetermined length.

7. The motorized drive roller conveyor of claim 6, wherein the one or more networked cards are further configured to receive user input to define the predetermined length.

8. The motorized drive roller conveyor of claim 1, wherein the one or more networked cards are further configured to:
stop the counter when the first item is stopped in an adjacent downstream zone, prior to the leading edge of the second item passing the sensor, to generate the counter value; and
cause the motorized drive roller assembly of an adjacent upstream zone to advance the second item a distance derived from the counter value.

9. The motorized drive roller conveyor of claim 8, wherein there two or more adjacent downstream zones.

10. The motorized drive roller conveyor of claim 1, wherein each zone is shorter in length than a length of the first and second item.

11. The motorized drive roller conveyor of claim 1, wherein the counter value is converted into a standardized unit of measurement.

12. The motorized drive roller conveyor of claim 7, wherein the user input defines the predetermined length in units of rotation of the drive roller.

13. The motorized drive roller conveyor of claim 7, wherein the user input defines the predetermined length in units of rotation of an integrated motor in the drive roller.

14. The motorized drive roller conveyor of claim 7, wherein the user input defines the predetermined length into a standardized unit of measurement; and
wherein the one or more networked cards are further configured to:
convert the user input into a second unit of measurement associated with the counter.

15. A motorized drive roller conveyor comprising:
a first zone, a second zone, and third zone, wherein the second and third zones are two diversion points downstream of the first zone, each zone including a drive roller and a sensor; and
one or more cards comprising:
an identification device that identifies a destination zone for an item,
one or more first drivers that control the first zone,
one or more second drivers that control the second zone, and
one or more third drivers that control the third zone,
the one or more cards configured to:
measure a gap between a first item, identified to divert to the second zone, a second item, identified to divert to the third zone, and a third item, identified to divert to the second zone, positioned consecutively on the conveyor by beginning a counter when a trailing edge of the first item passes a first sensor, in the first zone, and recording a first counter value indicating a length of a first gap when a leading edge of the second item passes the first sensor and recording a second counter value indicating a length of a second gap when a leading edge of the third item passes the first sensor,
detect the trailing edge of second item in the third zone by the second sensor in the second zone,
in response to the first item being stopped, advance the third item a distance derived from the second counter value to adjust the length of the gap.

* * * * *